July 7, 1925.                                                            1,545,217
C. H. THURBER
TEST PAPER
Filed Jan. 10, 1924
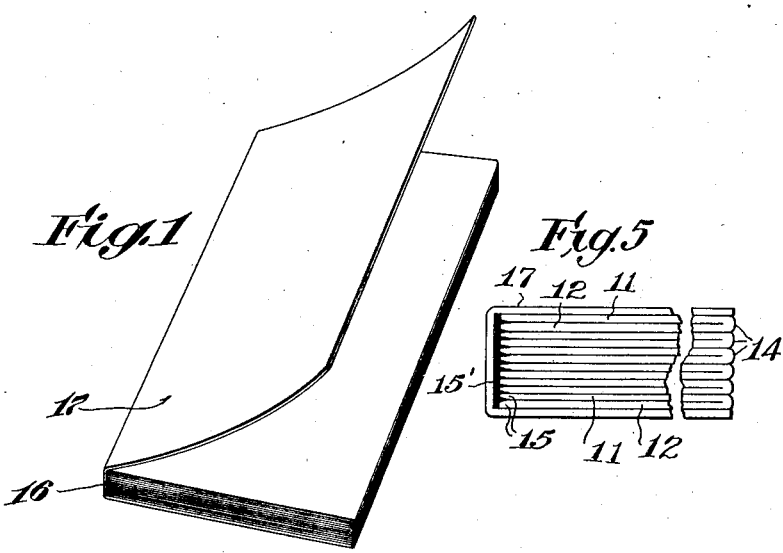
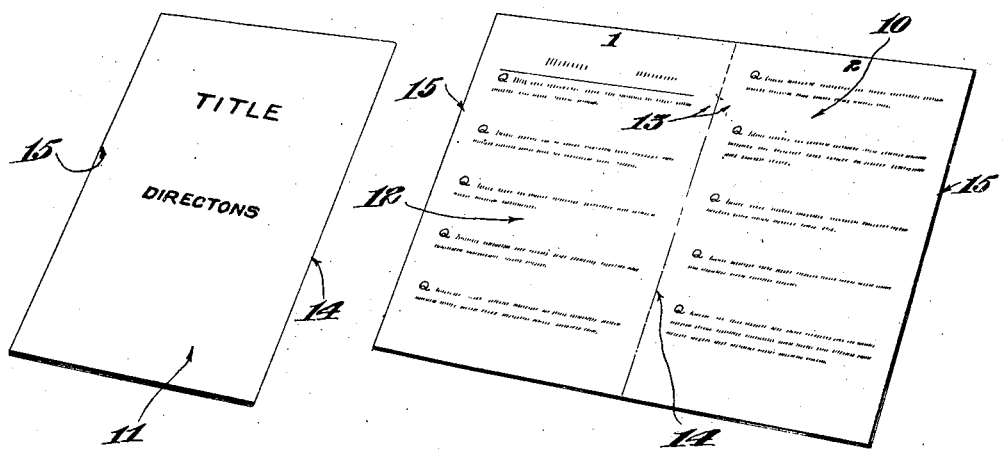
Witness:
Alfred H. McGlinchey.
Inventor:
Charles H. Thurber
by his attorneys Patented July 7, 1925.

1,545,217

UNITED STATES PATENT OFFICE.

CHARLES H. THURBER, OF FRAMINGHAM, MASSACHUSETTS, ASSIGNOR TO GINN AND COMPANY, OF BOSTON, MASSACHUSETTS, A COPARTNERSHIP.

TEST PAPER.

Application filed January 10, 1924. Serial No. 685,379.

*To all whom it may concern:*

Be it known that I, CHARLES H. THURBER, a citizen of the United States, residing at Framingham, in the county of Middlesex and State of Massachusetts, have invented certain new and useful Improvements in Test Papers; and I do hereby declare the following to be a full, clear, and exact description of the invention, such as will enable others skilled in the art to which it appertains to make and use the same.

The present invention relates to an improvement in test papers.

The object of the invention is to produce a test paper of convenient form for manufacture and shipment, and as well for convenient use in the class room where it is desirable that an accidental glance at or reading of the questions may be prevented. To the above ends the present invention consists in the test paper hereinafter described and particularly defined in the claim.

In the accompanying drawings illustrating the preferred form of the invention, Fig. 1 is a book of test papers; Fig. 2 is a view of a signature for a book of test papers; Fig. 3 illustrates the test paper open ready for use by the student; Fig. 4 is an end elevation of the book; and Fig. 5 is an enlarged transverse sectional view through the back-edge of the book.

The illustrated embodiment of the invention is described as follows: The test paper 10, comprises two leaves 11, 12, united at their free edges 13 by a fold 14. The binding edges 15, of the leaves are bound together by glue 15', preferably in a separable fashion. A convenient manner of binding together the binding edges 15, of the leaves is to stack the folded test papers in a pile and to apply glue to the edge of the pile at 16. This same glue may be, and preferably is, employed to hold the cover 17 on the book, or block, of test papers. The title and directions may be printed on the outside of the sheet 11. The questions are printed on the inside portions of the leaves, thereby concealed from accidental glance or intended perusal.

The book of test papers forms a convenient package for the manufacturer to produce and a convenient unit for packing for shipment. When the package of test papers is received at the school where it is to be used, the teacher may take the book of test papers to the class room and there it may be exposed on the desk ready for use without necessity for concealment that would be incident to the use of a test paper which had the questions on it in a visible position. When the teacher distributes these test papers to the students, he turns back the top cover of the book of test papers, takes hold of the corner of the signature or individual test paper, and tears it from the book, the binding of the paper into the book being a separable binding facilitating such tearing off, much the same as tearing off a sheet of paper from a pad. Ordinarily there is sufficient glue on the binding edges of the leaves of a signature to hold the leaves together while it lies on the desk of the student ready for use. Then the student may thrust his hand into the open end of the folded and bound signature, loosen the binding edges of the test paper, open it and apply himself to the test.

The present invention is not limited to the illustrated embodiment thereof, as it may be embodied in a variety of forms within the scope of the following claim.

Having thus described the invention, what is claimed is:

A book or pad of mental-test papers consisting of a series of signatures each consisting of a sheet of paper folded upon itself, the two free edges thereof being brought together and connected together by a temporary fastening means, these temporarily-fastened edges being bound together to form a book or pad, the binding being of such nature that the signatures may be singly detached with their free edges still connected together, one or both of the facing faces of each folded sheet bearing test-questions which will remain practically hidden not only until the signature is detached but also until the temporarily-bound edges of the sheet are disconnected after detachment.

CHARLES H. THURBER.